United States Patent Office 3,386,855
Patented June 4, 1968

3,386,855
LUBRICOUS COATING FOR GLASS
Addison B. Scholes, Muncie, Ind., assignor to Ball Brothers Company Incorporated, Muncie, Ind., a corporation of Indiana
No Drawing. Filed May 14, 1965, Ser. No. 455,962
9 Claims. (Cl. 117—124)

ABSTRACT OF THE DISCLOSURE

This invention pertains to glass coating composition, method and articles so coated wherein coating compositions including a polyolefin and a polyethylene derivative of a fatty acid is applied to glassware at a temperature above about 160° F.

---

The present invention relates to a new and improved durable, lubricous coating for glass and more particularly relates to an improved lubricous coating for glass articles such as glassware, to a novel method of forming such a coating on glass, and to a new composition employed in the formation of such a coating.

Glass articles such as glassware, are handled a great number of times during manufacture, inspection, shipping, filling, use, etc. During such handling, the ware comes into contact with various mechanical devices, e.g., feeders, conveyors, inspection devices and the like and also contacts other pieces of ware and surfaces such as boxes, shelves, etc.

This high degree of contact causes damage by breakage, cracking, scratching or other defacing of the surface thereof. Breakage during processing creates a serious problem in that a processing line may jam which requires attention by a person, e.g., to clean the broken ware from the line. The possibility of interruption of a line due to breakage of ware necessitates a higher degree of supervision than may actually be required. Breakage during processing also is serious because of the possibility of slivers or fragments of the shattered glass being deposited in adjacent ware which is undesirable in most situations and is completely unacceptable when the ware is to be used for food packaging.

Attempts have been made in the past to minimize or eliminate the above difficulties by the application of various coatings to glass. While the coatings proposed, in some cases, have reduced breakage and damage to a degree, the coatings have created other problems. For example, it sometimes has been difficult to formulate the coating composition or to apply the composition to the ware, or labels did not tightly adhere to the coated surfaces. Other coatings were not sufficiently permanent to retain the improved lubricity after washing or steam cleaning and thus were unsuccessful. Many coatings were not acceptable because they had not been approved for use in food. Thus, none of the coatings provided the desired combination of improved properties.

In view of the above and other difficulties and problems with coatings for glass heretofore employed, it was surprising to discover a new and improved coating for glass which overcomes many of the problems encountered in the past and, in addition, provides benefits and advantages heretofore considered unattainable. The coating of the present invention provides a highly lubricous surface on glass which reduces damage during handling to a minimum. Also, the coating is durable and does not lose its effectiveness when subjected to hot water or steam. Furthermore, the coating provides a surface to which labels adhere tightly even after extended periods of storage and handling. Moreover, the methods of formulating the composition and coating glass surfaces in accordance with the invention are simple, convenient and relatively low in cost. Another advantage of the coating of the invention is that the appearance of the glass is not changed.

The novel lubricous coating for glass of the present invention comprises a reaction product of a dispersed polyolefin and a polyoxyethylene derivative of a fatty acid. The coating of the present invention is advantageously formed on glass by applying a mixture comprising a dispersed polyolefin and a polyoxyethylene derivative of a fatty acid to the glass and heating the coating to a temperature above about 160° F. During heating, the components of the coating composition react to produce a durable, lubricous, substantially water-insoluble coating.

The polyolefin employed in the coating of the present invention advantageously has a molecular weight of less than about 3000 and preferably in the range of about 1200 and 2700. Preferably, the polyolefin is a polyethylene having a molecular weight in the range of about 1600 to 2500.

The polyoxyethylene derivative advantageously is formed by the treatment of a fatty acid having about 12 to 18 carbon atoms with ethylene oxide. The proportion of the ethylene oxide is preferably between 5 and 50 mols for each mol of the fatty acid. Suitable fatty acids include oleic, stearic, lauric, palmitic acids with the stearate being preferred.

In addition to the principal components of the coating, as set forth above, other materials may be included therein provided they do not deleteriously affect the improved properties and characteristics of the coating. For example, dispersing or emulsifying agents may be employed to facilitate mixing of the components of the coating composition. Also, it may be desirable to improve the "shelf life" of the composition by incorporating stabilizers, bactericides, mold inhibitors or similar materials.

The proportion of the fatty acid derivative is generally substantially less than that of the polyolefin and advantageously between about 10% and 40%, with 15% to 25% being preferred.

The coating composition of the present invention may be prepared by forming a dispersion of the polyolefin and the polyoxyethylene derivative in water. The dispersion advantageously is formed by heating the mixture under pressure to a temperature above the melting point of the polyolefin. Preferably, the pressure is between about 10 and 15 p.s.i. during the reaction with a temperature between about 240° and 250° F. and about equal proportions of the polyolefin and water. Advantageously, the proportion of either of the basic ingredients does not comprise more than about 150% by weight of the other. Generally, a concentrate is prepared and then diluted as required. The concentrate is diluted with water to provide a concentration of the polyolefin in the final coating composition of between about 0.05% and 0.5%, and preferably between about 0.1% and 0.2% by weight of the composition. Although compositions containing proportions of polyolefin outside the preferred range produce benefits and advantages of the invention, the lower concentrations tend to produce very thin coatings which are less desirable since a number of coats are required, while high concentrations tend to produce compositions of higher viscosity making it more difficult to form a smooth, uniform coating which does not change the appearance of the glass.

The composition of the present invention employed to coat the glass advantageously comprises between about 0.05% and 0.5% by weight of polyolefin, and preferably between about 0.1% and 0.2% as set forth above. The concentration of the oxyethylene derivative of the fatty acid is advantageously between about 0.005% and 0.2% by weight of the composition and preferably between about 0.01% and 0.1%. Advantageously, the other components, e.g., bactericide, etc., comprise less than about 0.1% by weight of the composition with a concentration in the range between about 0.005% and 0.05% being preferred.

The composition may be applied to the glass by any convenient method and preferably by spraying or atomizing. Advantageously, the composition is applied to the glass at a temperature above about 160° F. Coating of the glass may be conveniently accomplished as the hot glass emerges from an annealing lehr. However, if desired, the composition may be applied to cold glass either before or during reheating thereof.

The maximum temperature to which the coating is exposed to form the desired reaction product is not critical but is limited by the temperature which causes the glass to thermal shock, that is, cracking or crazing of the surface. Preferably, the coating is heated to a temperature in the range of about 180° to 500° F.

The invention will be described in detail with reference to the following examples. It is intended that the examples be illustrative of the invention and not limiting the invention to the specific procedures and conditions set forth. In the examples, percentages are by weight.

Example I

To 40 gallons of water were added 200 pounds of polyethylene having a molecular weight of about 1500, 25 pounds of polyoxyethylene monostearate containing about 25 mols of ethylene oxide per mol of stearic acid and 50 pounds of polyoxyethylene sorbitan monostearate containing about 5 mols of polyoxyethylene per mol of stearic acid. The mixture was heated with stirring to about 240° F. in a closed vessel maintained at a pressure of about 10 p.s.i. and held at that temperature for about 30 minutes. The mixture was cooled with stirring to about 170° F. and then 40 gallons of water were added with additional stirring.

The resulting composition was diluted with water for use to a composition containing about 0.2% polyethylene and 0.08% polyoxyethylene monostearate. This composition was sprayed onto a series of 5-ounce glass baby food jars as the jars emerged from an annealing lehr. The jars were at a temperature of about 200° F. The coated jars were allowed to cool slowly while maintaining a temperature above about 160° F. for about 1 minute.

Samples of the coated jars, together with uncoated control samples formed prior to and succeeding the coated jars, were tested to determine the coefficient of friction of the external surface thereof. The coefficient of friction for the coated jars was only about one-fourth that of the similar uncoated jars.

The durability of the coating was determined by submerging the jars in a pressure cooker. The water in the cooker was heated to about 250° F. and maintained at about 15 p.s.i. pressure for approximately 30 minutes. The jars were removed from the pressure cooker and permitted to cool and the lubricity checked again. Although the coefficient of friction for the coated jars was slightly greater, it was still only about one-third that of similar uncoated jars.

Labeling tests were also conducted with samples of the coated jars to determine the labeling characteristics. In all cases, labels adhered tightly even after exposing the labeled jars to a steam treatment at about 220° F.

Example II

The procedure of this example was the same as that of Example I, except that about 150 pounds of polyethylene were employed in place of the quantity recited in Example I. After dilution, the composition applied to the jars contained about 0.15% polyethylene and 0.08% polyoxyethylene monostearate.

The coated jars were tested according to the procedures of Example I and found to show the improvement and advantages exhibited by the coated jars of Example I.

Example III

The procedure of this example was the same as that of Example I, except that about 60 gallons of water were employed in diluting the concentrated mixture to form the coating composition.

The coating was applied to glass jars by spraying while the jars were at a temperature of approximately 180° F. The coated jars were tested and found to show improvements over uncoated jars similar to those of Examples I and II.

Example IV

The procedure of this example was the same as that of Example I, except that about 25 pounds of polyoxyethylene monopalmitate were used instead of the 25 pounds of polyoxyethylene monostearate. Coated jars exhibited the superiorities and advantages shown by the coated jars of Examples I, II and III.

It is clear from the above description and examples that the present invention provides a new and improved coating for glass which overcomes many of the problems encountered heretofore and in addition, provides benefits and advantages which previously were not attainable. The coating of the invention provides a highly lubricous, durable coating which greatly minimizes damage to glass during handling and use. Moreover, labels adhere tightly to the coated surfaces even after extended periods of handling and storage. In addition, the methods of the invention for formulating the composition and coating the glass surfaces are simple and convenient and relatively low in cost. Furthermore, the coating of the invention does not change the appearance of the glass.

It will be apparent from the above description that various modifications in the formulations and procedures described may be made within the scope of the invention. Therefore, the invention is not intended to be limited to the specific details described herein except as may be required by the following claims.

What is claimed is:

1. A glass article coated with a durable, lubricous coating comprising the reaction product of a dispersed polyethylene, said polyoxyethylene derivative comprising between about 10% to 40% by weight of the polyethylene in said coating and a polyoxyethylene derivative of a fatty acid.

2. A glass article coated with a durable, lubricous coating comprising the reaction product of a dispersed polyolefin and a polyoxyethylene monostearate, said polyoxyethylene monostearate comprising between about 10% to 40% by weight of the polyolefin in said coating.

3. A glass article coated with a durable, lubricous coating comprising the reaction product of a dispersed polyethylene and polyoxyethylene monostearate, said polyoxyethylene monostearate comprising between about 10% to 40% by weight of the polyethylene in said coating.

4. A glass article coated with a durable, lubricous coating comprising the reaction product of a dispersed polyolefin and a polyoxyethylene derivative of a fatty acid; said polyoxyethylene derivative comprising between about 10% and 40% by weight of the polyolefin in said coating.

5. A glass article coated with a durable, lubricous coating comprising the reaction product of a dispersed polyethylene and polyoxyethylene monostearate; said monostearate comprising between about 15% and 25% by weight of the polyolefin in said coating.

6. A method of forming a durable, lubricous coating on a glass surface which comprises applying to said surface an aqueous mixture comprising a dispersed polyolefin and a polyoxyethylene derivative of a fatty acid and heating said applied coating to a temperature above about 160° F., said polyoxyethylene derivative comprising between about 10% and 40% by weight of the polyolefin in said coating.

7. A method of forming a durable, lubricous coating on a glass surface which comprises applying to said surface while it is at a temperature above about 160° F. an aqueous mixture comprising a dispersed polyethylene and a polyoxyethylene derivative of a fatty acid, said polyoxyethylene derivative comprising between 10% to 40% by weight of the polyethylene in said coating.

8. A method of forming a durable, lubricous coating on a glass article which comprises applying to said article an aqueous mixture comprising a dispersed polyolefin and a polyoxyethylene derivative of a fatty acid and heating said applied coating to a temperature above about 180° F.; said aqueous mixture containing between about 0.05% and 0.5% by weight of the polyolefin and between about 0.005% and 0.2% by weight of the polyoxyethylene derivative.

9. A method of forming a durable, lubricous coating on a glass article which comprises applying to said article while it is at a temperature between about 180° F. and 500° F. an aqueous mixture comprising between about 0.1% and 0.2% by weight of a dispersed polyethylene and between about 0.01% and 0.1% by weight of a polyoxyethylene monostearate.

References Cited

UNITED STATES PATENTS

| | | | |
|---|---|---|---|
| 2,525,691 | 10/1950 | Lee | 260—31.4 |
| 3,177,174 | 4/1965 | Tirpak | 260—31.4 |
| 2,965,596 | 12/1960 | Sharf | 117—124 |
| 2,995,533 | 8/1961 | Parmer | 117—124 |

JULIUS FROME, *Primary Examiner.*

Disclaimer 3,386,855.—*Addison B. Scholes*, Muncie, Ind. LUBRICIOUS COATING FOR GLASS. Patent dated June 4, 1968. Disclaimer filed Nov. 12, 1971, by the assignee, *Ball Corporation*.

Hereby enters this disclaimer to claims 8 and 9 of said patent.

[*Official Gazette March 7, 1972.*]